United States Patent [19]

Johnson et al.

[11] Patent Number: 5,628,100
[45] Date of Patent: May 13, 1997

[54] METHOD OF MAKING AN ACCELERATION SENSOR

[75] Inventors: Larry K. Johnson, North Attleboro; Eric P. Reidemeister, Norton, both of Mass.; Robert O. Southworth, Pawtucket; Michael D. Gouin, North Smithfield, both of R.I.; William Silva, Taunton; Andrew A. Amatruda, Jr., Attleboro, both of Mass.

[73] Assignee: Texas Instruments Incorporated, Dallas, Tex.

[21] Appl. No.: 437,687

[22] Filed: May 9, 1995

Related U.S. Application Data

[62] Division of Ser. No. 148,042, Nov. 4, 1993, Pat. No. 5,555,766.

[51] Int. Cl.⁶ .................................................. H01G 5/16
[52] U.S. Cl. .................................................. 29/25.41; 29/837
[58] Field of Search ........................... 29/25.41, 837–839; 361/280, 283.3; 73/514.32, 514.36

[56] References Cited

U.S. PATENT DOCUMENTS

| | | |
|---|---|---|
| Re. 31,549 | 4/1984 | Ballard et al. . |
| 3,240,073 | 3/1966 | Pitzer . |
| 4,231,010 | 10/1980 | Cardin . |
| 4,435,737 | 3/1984 | Colton . |
| 4,483,194 | 11/1984 | Rudolf . |
| 5,044,202 | 9/1991 | Southworth et al. . |

FOREIGN PATENT DOCUMENTS

| | | |
|---|---|---|
| A-0491506 | 6/1992 | European Pat. Off. . |
| A-0542436 | 5/1993 | European Pat. Off. . |
| U-8913756 | 1/1990 | Germany . |
| 1138728 | 1/1969 | United Kingdom . |

Primary Examiner—Carl E. Hall
Attorney, Agent, or Firm—Russell E. Baumann; Richard L. Donaldson; René E. Grossman

[57] ABSTRACT

An acceleration sensor is shown having a substrate (16, 16', 16", 16'") on which a capacitor detect plate (24) and source plate mounting portion (28c) are disposed. An electrically conductive blade member (40, 44) having an attachment portion (40a, 44h), a source plate portion (40i, 44a) and integrally attached beams (40b, 40c; 44b) extending along opposite sides of the blade member is mounted on the substrate by welding the attachment portion to a mounting element (36, 36', 36", 36'") which is closely received in a bore (32, 32', 32", 32'") formed through the substrate at the source plate mounting portion. The mounting element or the bore is formed with a surface suitable for forming an interference fit and for making electrical engagement with a conductive layer received in the bore. The mounting element has one end (36b, 36b', 36b") which extends above the top surface (26, 26") an adjustable selected amount(s) to provide desired spacing between the source plate portion and the detect plate. A single mounting element of a pair of mounting elements can be used and may be in the form of a solid (36, 36", 36'") or a hollow (36') pin.

17 Claims, 7 Drawing Sheets

METHOD OF MAKING AN ACCELERATION SENSOR

This application is a division of application Ser. No. 08/148,042, filed Nov. 4, 1993, now U.S. Pat. No. 5,555,766.

BACKGROUND OF THE INVENTION

This invention relates generally to condition sensors and more particularly to accelerometers having mechanically movable means responsive to acceleration for providing a corresponding electrical signal.

Condition sensors such as capacitive accelerometers and the like of various types as shown in U.S. Pat. Nos. 4,483,194 to Rudolph; 4,435,737 to Colton; Reissue 31,549 to Block and 3,240,073 to Pitzer are commonly used or proposed for use in aircraft and vehicular applications and the like where the sensors are likely to be subjected to shock, vibration and severe temperature changes but where it would be desirable for the sensors to be inexpensive and to display reliable and accurate performance characteristics over a long service life. However, many such sensors have limited performance capability or are manufactured at excessive cost. It would be desirable if such sensors could be provided with improved reliability in performance and could be made at reduced cost to find wider application.

In copending application, Ser. No. 07/790,956 assigned to the assignee of the present invention, compact, rugged and inexpensive accelerometer devices are disclosed comprising a stiff, rigid, electrically insulating ceramic substrate having a recess in the form of a groove formed in one substrate surface. Electrically conductive film means are deposited on that surface to define a capacitor detect plate inside the recess, a capacitor source plate connector pad outside the recess and circuit paths which are connected to the detect plate and source plate connector and to respective terminal pads along an edge of the substrate surface. The accelerometer device further includes a flat, electrically conductive plate or blade member of stiffly resilient metal which is formed with an attachment portion, a capacitor source plate portion and integral resilient beam means in a common plane. The attachment portion of the member is secured in electrically conductive relation to the source plate connector on the substrate with a thin layer of solder. Spacing between the upper surfaces of the detect plate and the source plate is determined by the depth of the recess. In one embodiment, glass frit including a bonding glass meltable at one temperature and glass rods of a small, precisely determined diameter which remain shape-retaining at the melting temperature of the bonding glass is deposited over two spaced portions of the source connector to provide a precise level of attachment of the source plate to the source plate connector.

Although devices made in accordance with the teachings of the above referenced patent application are very effective and perform well, the use of solder as a means of attachment involves a relatively time consuming reflow process and requires flux cleansing. In addition, there is a tendency for elements connected by solder to move slightly over time due to so-called solder creep thereby adversely affecting calibration of the device.

In copending application, Ser. No. 07/628,249 assigned to the assignee of the present invention, another accelerometer device is shown comprising an essentially flat electrically insulating substrate with a detect plate and a source plate connector disposed thereon and with a similar conductive blade member secured to the substrate in electrically conductive relation to the capacitor source plate connector. Spacing between the source plate portion and the detector plate is accomplished by using a shim between the attachment plate portion and the source plate connector in one embodiment and in another embodiment by reducing the thickness of the metal plate. However, use of a shim adds an additional part and process step which adds to the cost of the device as well. Further, when using a shim it is difficult to obtain close dimensional control from device to device. Use of a metal plate having a reduced thickness portion results in a more expensive blade member and one for which it is difficult to provide a properly balanced and mounted source plate portion.

BRIEF SUMMARY OF THE INVENTION

It is an object of the invention to provide an improved acceleration sensor; to provide a novel and improved acceleration sensor which is particularly adapted for use in vehicle applications; to provide an improved movable blade and an improved method for attaching the movable blade to the acceleration sensor and structure provided by such method; to provide an accelerometer device having lower thermal errors than prior art accelerometer devices; and to provide an acceleration sensor which is of compact, rugged structure yet relatively inexpensive to produce.

Briefly, in accordance with the invention, a base having at least the top surface of electrically insulating material is provided with an electrically conductive detect plate on a top surface thereof and at least one bore between top and bottom surfaces. An electrically conductive metal plate or blade is formed having an attachment portion, a source plate portion and an integral beam means connecting the attachment portion to the source plate portion. The attachment portion is fixedly attached, as by welding, to the end of an electrically conductive element such as a solid or hollow pin inserted into the bore with the source plate portion spaced a selected distance from the detect plate and with the element in electrical engagement with a conductive path which extends from the top surface of the substrate into the bore. According to a feature of the invention, once the metal blade is fixed to the pin, the axial position of the pin may be adjusted to provide a selected capacitance level between the detect plate and the source plate portion. According to another feature of the invention, the conductive path is formed by screen printing on the top surface and drawing the liquid coating material by means of a vacuum through an annular space defined between the wall of the bore and an insert placed in the bore during the coating step. The bore is specially formed with a flow inducing entrance, a burr accommodation section and a flow preventing exit. In accordance with one embodiment, the pin is knurled along at least a portion of its length while in another embodiment the pin is formed with a plurality of longitudinally extending ribs having an outer surface forming arcs of a circle having a diameter which provides an interference fit in the bore. In another embodiment the pin is tubular with a closed end formed into a weld projection surface. In yet another embodiment the bore is formed with a plurality of splines or other inwardly projecting surface portions and the pin is formed with a conventional cylindrical wall surface. The pin is inserted into the bore with an insertion force of between approximately 10 pounds minimum and 200 pounds maximum. According to another embodiment, a pair of bores are provided in the base and a pair of pins are attached to the attachment portion and inserted in respective bores to prevent any possible rotational movement of the pins. According to a feature of the invention, the pin(s) and conductive metal plate may both be formed of the same material, for example, alloy 42 when the substrate is formed of $Al_2 O_3$ ceramic to closely match the thermal coefficient of expansion of the substrate. In one embodiment of the invention the attachment portion of the metal blade member is disposed at one end portion of the blade while in another embodiment the attachment portion is disposed in the center of the blade member to provide a center of mass of the blade member in alignment with the location of attachment. An additional advantage of a central attachment portion is that it provides a shorter distance between the location of attachment and the center of seismic mass.

BRIEF DESCRIPTION OF THE DRAWINGS

Other objects, advantages and details of the novel and improved accelerometer sensor of the invention and of the method of making the sensor appear in the following detailed description of preferred embodiments of the invention, the detailed description referring to the drawings in which.

DETAILED DESCRIPTION OF THE PREFERRED EMBODIMENTS

Figure 1:
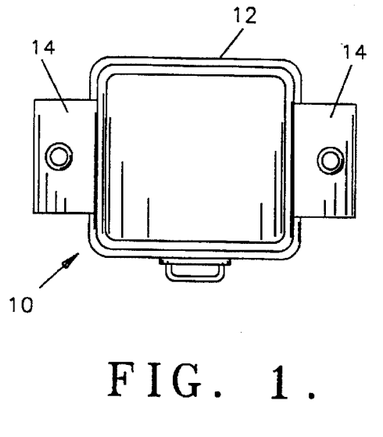
FIG. 1 is a plan view of an acceleration sensor made in accordance with the invention.
Figure 2:
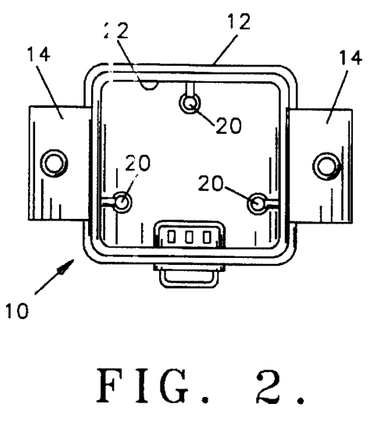
FIG. 2 is a plan view of a base member used in the sensor of FIG. 1.
Figure 3:
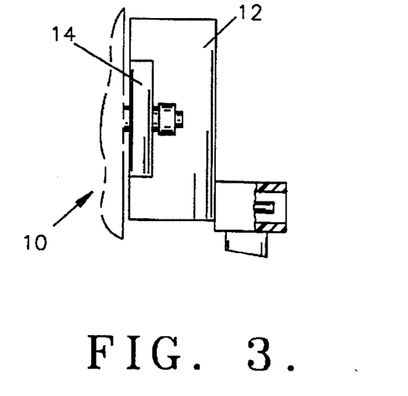
FIG. 3 is a side elevation view, partially in section, of the sensor shown in FIG. 1.
Figure 4:
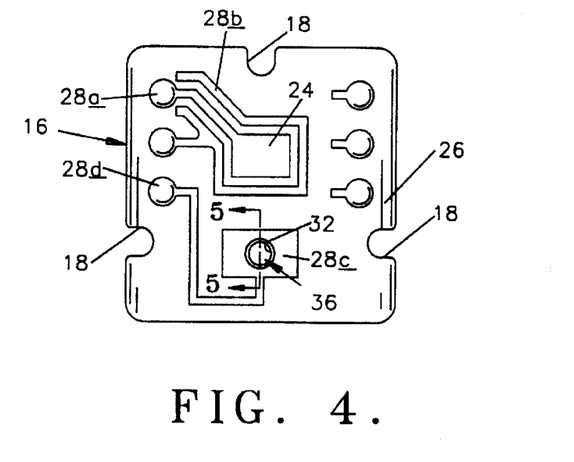
FIG. 4 is a plan view of a substrate shown in a larger scale used in a first embodiment of the invention.

Referring to FIGS. 1–3 of the drawings an acceleration sensor 10 made in accordance with the invention, includes a housing 12 having suitable mounting tabs 14 for attachment to a body, such as a vehicle, the acceleration of which is desired to be monitored. A substrate 16, FIG. 4, formed of suitable material such as electrically insulative aluminum oxide, $Al_2 O_3$, is provided with slots 18 adapted to receive mounting posts 20 in a recess 22 of base 12. It will be understood that the substrate could be composed of various materials such as metal, for example, having an electrically insulative top surface, if desired. Substrate 16 is provided with an electrically conductive detect plate 24 on a top surface 26 thereof. Plate 24 can be placed on the substrate in any suitable manner, as by screen printing. Associated circuit paths 28a, 28b, 28c are also formed on surface 26 in a similar manner. A bore 32 is formed extending through the substrate 16 at source plate mounting portion 28c and is provided with a shallow recess 32a (FIG. 5) on top surface 26 and a relatively larger well recess 32b on bottom side 34 surrounding bore 32. A mounting element in the form of a pin 36, formed of material having a coefficient of thermal expansion closely matching that of substrate 16, is received in bore 32. For example, where the substrate employed is composed of 94 percent alumina ceramic, pin 36 can be formed of Alloy 42, an alloy having a nominal composition by weight of 42 percent nickel and the balance iron. Both Alloy 42 and 94 percent alumina have coefficients of thermal expansion approximately $6.0 \times 10^{-6}$ cm/cm/°C. in the temperature range from 25° to 100° C. and comparable expansion properties over the range $-40°$ C to 125° C. Pin 36 is formed with a knurled surface portion 36a which extends around its periphery for a selected longitudinal portion of its length to provide an interference fit in bore 32. For a bore in the order of 0.094/0.096 inches the diameter of pin 36 can be on the order of 0.099/0.097 inches so that a force of between approximately 10 and 200 pounds is required for inserting the pin into the bore without cracking the substrate. Pin 36 is formed with a curved end portion 36b on either end to serve as a weld projection.

Figure 5:
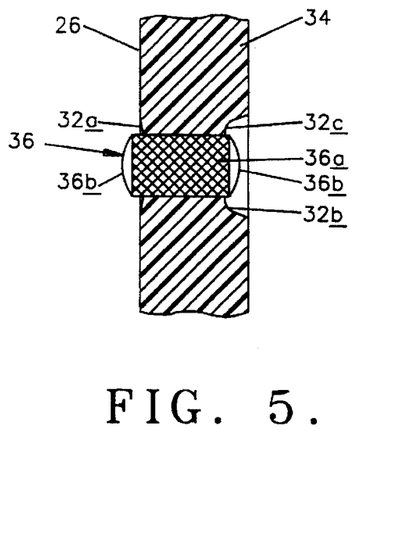
FIG. 5 is an enlarged cross sectional view taken on line 5—5 of FIG. 4.
Figure 5A:
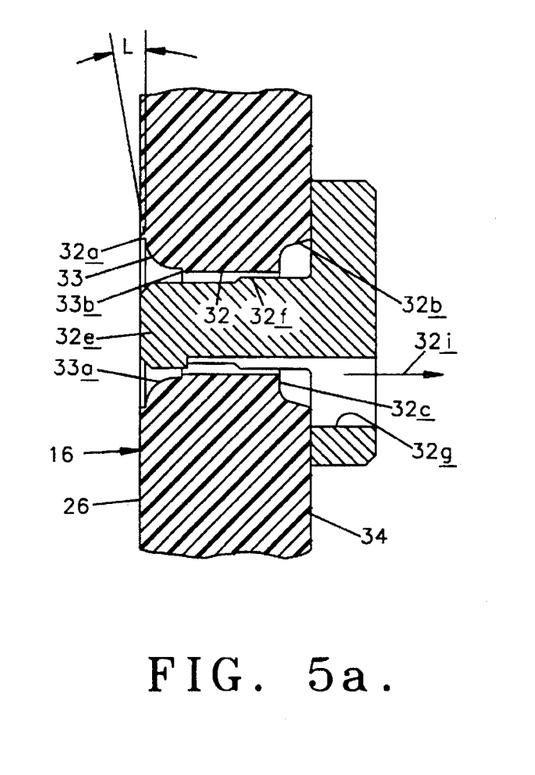
FIG. 5a is an enlarged cross sectional view taken through a portion of a substrate shown with a screen printing fixture received in a bore in the substrate.
Figure 5B:
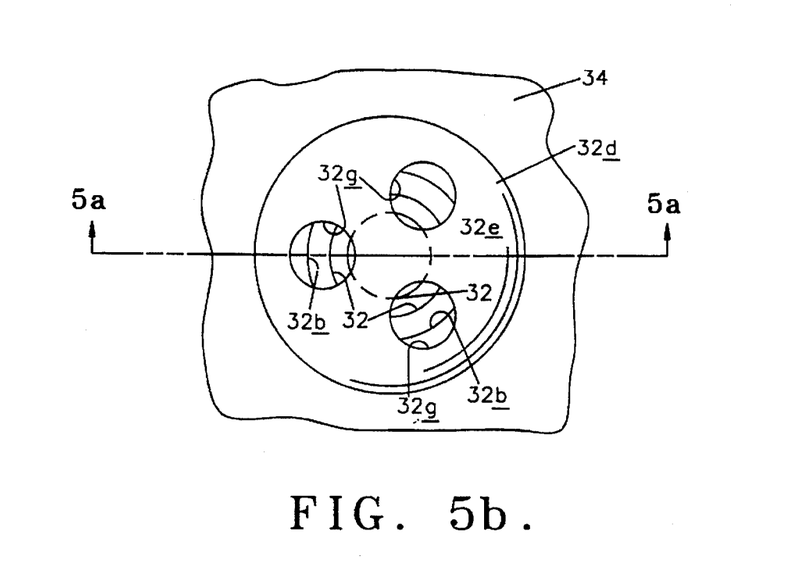
FIG. 5b is a bottom plan view of the FIG. 5a substrate and fixture.

Preferably, at least circuit path 28c is formed of metalloorganic gold in order to provide a sub-micron surface conductive path on the wall defining bore 32 which will not be wiped off by pin 36 when it is inserted in bore 32. Preferably, recess 32a is formed in top surface 26 to form a flow inducing surface. As seen in FIG. 5a, a frusto-conical ramp having a shallow angle α, for example, 13° relative to surface 26 has been found to be suitable for promoting flow of coating material into the bore. Ramp 32a blends in with a radius 33 of approximately 0.025 inches at approximately 0.002 inches below top surface 26 formed at the entrance of burr accommodation section 33a. This provides adequate material above the radius so that grinding of the top surface to provide a smooth flat surface will not affect the radius and there will be a smooth, gradual curved surface on which the liquid coating material can flow during the screening process. Intermediate burr accommodation section 33a preferably is used to provide sufficient space and a trap for any burr which might occur when a mounting pin is inserted into bore 32 from surface 26 thereby preventing any interference fit with the welding operation or the blade. A transition surface 33b extends from section 33a to bore 32 and is inclined relative to the longitudinal axis of bore 32 at a suitable angle, e.g., 35–45°, to ensure that coating material applied to the bore will not be interrupted. On the other hand well recess 32b is formed on the bottom surface 34 with a surface portion 32c which is preferably 900 or more relative to the wall defining bore 32 so that the flow of any coating material received in the bottom of the bore will be interrupted to break the conductive path and prevent any possibility of an electrical shorting path to bottom surface 34. Well 32b can also conveniently receive epoxy which can be provided if desired, as an additional locking mechanism for the pin once the device has been calibrated as will be discussed infra. As seen in FIG. 5a a screen printing fixture pin 32d is preferably used when screen printing the conductive layers onto substrate 16. Pin 32d has an outer distal post portion 32e having an outer diameter selected to be slightly smaller than the diameter of bore 32 in order to define an annular opening between the pin and the wall defining bore 32 so that the coating material will flow through the annular opening in intimate contact with the wall to ensure that the entire wall surface is coated. Portion 32f of pin 32d closely fits within bore 32 and centers post 32e within the bore while bores 32g provide channels for applying a suitable vacuum indicated by arrow 32i to draw the coating material down into the bore. With a bore 0.099–0.097 inch a distal post portion 32e having a diameter of approximately 0.082–0.088 inch provides a suitable annular passage between the substrate and the distal post portion 32e of approximately 0.005–0.009 inch for use with metallo-organic gold.

After the coating operation has been completed insertion of pin 36 into bore 32 using an interference fit results in the knurled surface 36a electrically engaging material 28c on the wall defining bore 32.

Figure 6:
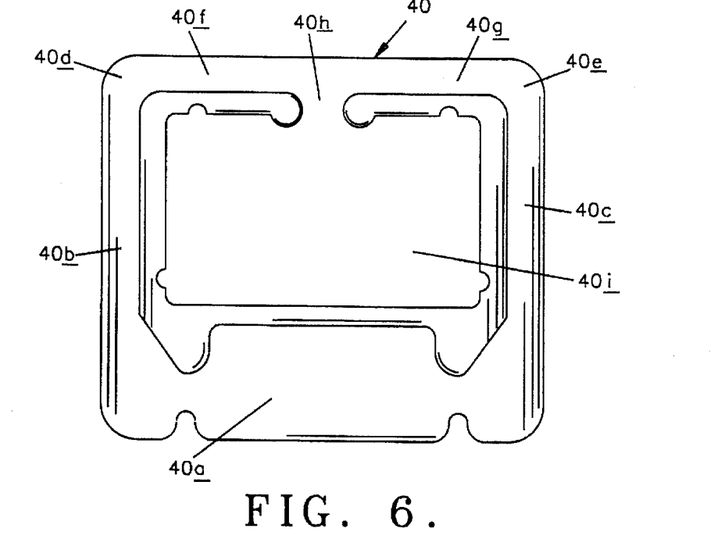
FIG. 6 is a plan view of an enlarged scale of a blade member used with the FIG. 4 substrate to form a sensor adapted to be received in the FIG. 2 base member.
Figure 8:
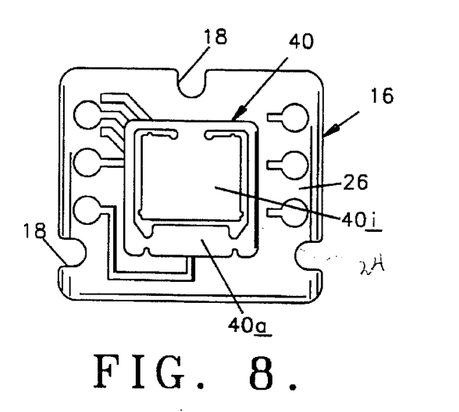
FIG. 8 is a plan view of reduced scale of the FIG. 4 substrate with the FIG. 6 blade member mounted thereon.

An electrically conductive blade member 40, FIG. 6, of the type disclosed in copending application, Ser. No. 07/790, 956 referenced supra, which may be formed of the same material as pin 36, e.g., Alloy 42, has an attachment portion 40a which is attached to pin 36 as by resistance welding or the like on weld projection 36b. Blade member 40 has integrally attached first and second beams 40b, 40c extending away from attachment portion 40a on opposite sides of blade 40 to a respective distal end 40d, 40e. Third and fourth beams 40f, 40g extend laterally from the distal ends to a central portion 40h attached to source plate portion 40i which extends back toward attachment portion 40a. Attachment portion 40a is welded to pin 36 so that source plate portion 40i is aligned over detect plate 24 as shown in FIG. 8. Welding can be effected either before or after the pin is inserted into bore 32. Once inserted, electrical continuity can be checked between pin 36 and output pad 28d. If the pin is welded to the blade member prior to insertion into bore 32 capacitance between the detect plate and the source plate portion can be monitored by connecting them to an electrical source as denoted by arrows T1 and T2 in FIG. 4. A force is then applied through the blade member to the pin pushing the pin into the bore until a selected capacitance value is obtained. If the pin is inserted into the bore prior to welding, this can be conveniently accomplished by inserting the pin into the bore leaving a space between the top of the pin and a plane in which the detect plate lies, i.e., the top surface of the substrate, greater than that which will provide the selected capacitance level, e.g., greater than "s" shown in FIG. 15, and then welding the blade member to the pin. The capacitance is then monitored as a force is applied through the blade member to the pin moving the pin until the selected capacitance level is obtained. It will be realized that the pin could also be inserted, prior to welding, leaving less than the space required to provide the selected capacitance level and then a force could be applied to the bottom of the pin through bore 32 pushing the pin and blade member away from the detect plate until the selected capacitance value is obtained. In all of the above procedures the position of the pin can be adjusted to provide the gap required to obtain the selected capacitance level resulting in virtually 100 percent yield and providing consistency from one device to another. This provides additional advantages in enhancing the frequency response or damping factor due to the consistent air gap from device to device as well as facilitating placement of stop surfaces to prevent over-travel.

Figure 7:
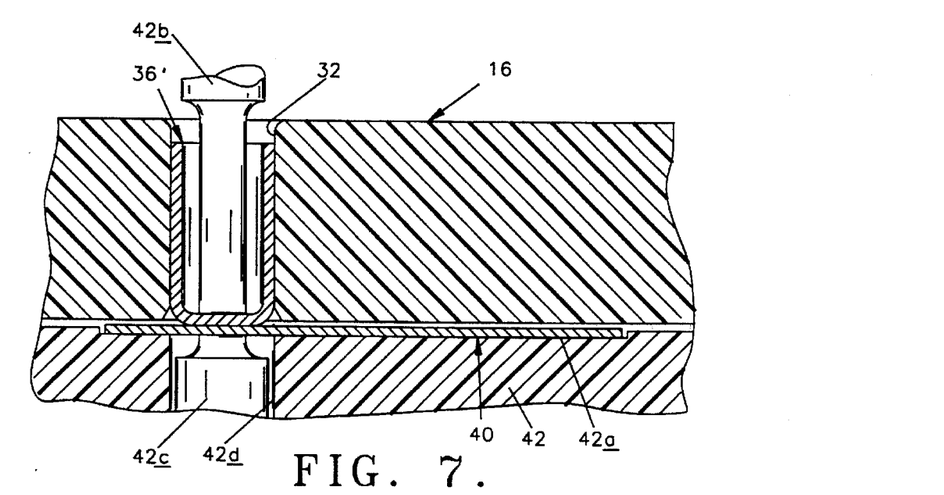
FIG. 7 is a cross sectional view of an enlarged scale of a portion of a substrate and a blade member in a jig in preparation for attachment of the blade member to a support provided in a modified embodiment of the invention.
Figure 7A:
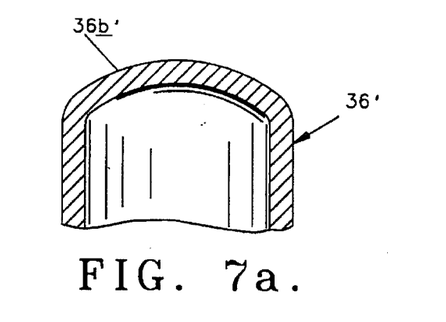
FIG. 7a is an enlarged cross sectional view of a portion of a blade member attachment element used in the FIG. 7 embodiment.

A modified embodiment is shown in FIG. 7 in which the blade member mounting element takes the form of a cup-shaped hollow pin 36' in place of the solid pin 36 shown in FIG. 5. Hollow pin 36' again may be formed of the same material as blade 40, e.g., 0.010 inch Alloy 42, and is inserted into bore 32 in substrate 16. Blade member 40 is placed in a recess 42a of a suitable electrically insulating jig 42. A movable electrode 42b is received in hollow pin 36' and a stationary electrode 42c is disposed in a bore 42d of jig 42 and in alignment with electrode 42b for welding hollow pin 36' to blade 40. Preferably, hollow pin 36' is formed with a radiused closed end 36b', as shown in FIG. 7a to serve as a weld projection.

Figure 9:
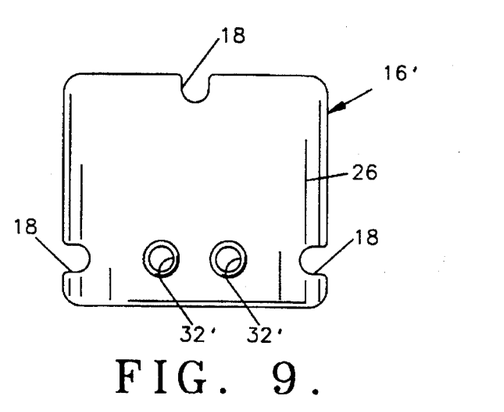
FIG. 9 is a plan view of the same scale as FIG. 8 of a modified substrate useful with the FIG. 6 blade member.

Another modified embodiment of the invention is shown in FIG. 9 in which substrate 16' is provided with a pair of bores 32' in order to provide improved anti-rotational control of a blade member mounted on the substrate.

Figure 10:
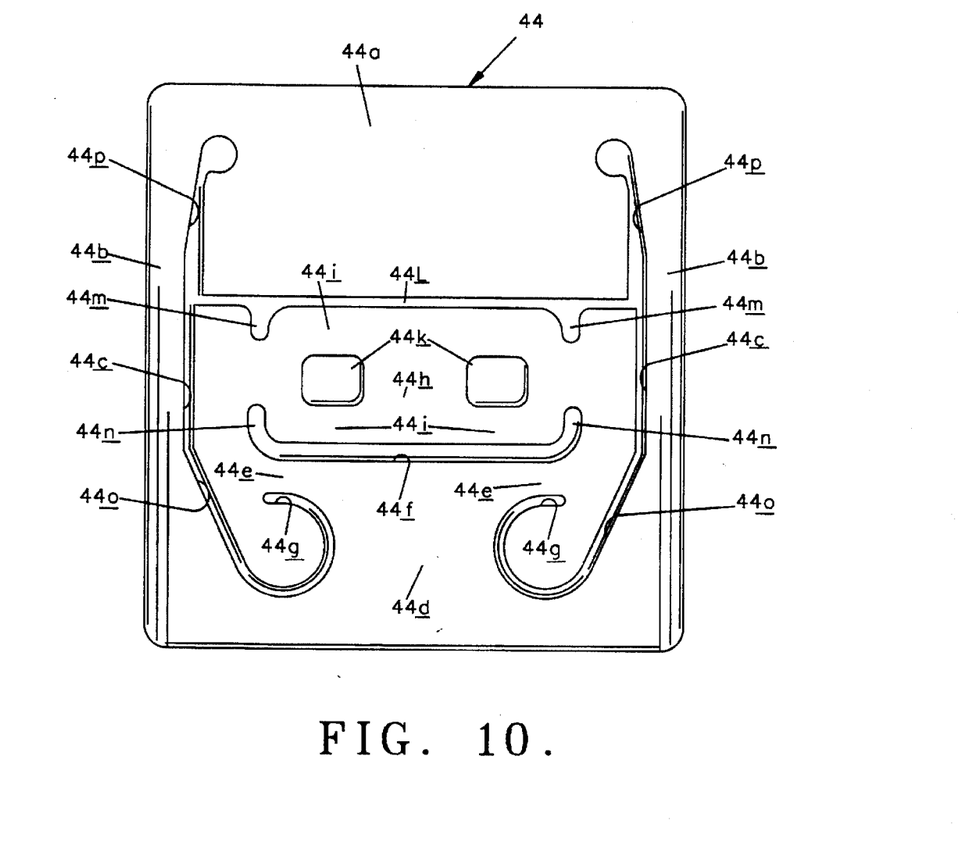
FIG. 10 is a plan view of an enlarged scale of a modified blade member useful in the FIG. 1 acceleration sensor.

FIG. 10 shows a preferred embodiment of a blade member having an integral source plate portion with improved thermal error characteristics. Any differences in coefficient of thermal expansion of joined ports, however small, will result in the joint being stressed when changes in temperature of joined materials occurs. The most common effect of this thermal stress is a bending of the joined material—called the bimetal affect. Blade member 44 incorporates several features which minimize the outward affects of bending caused by thermal expansion mismatch in the attached joint.

As in the previous embodiments, blade member 44, is formed of material having a selected coefficient of thermal expansion relative to that of the substrate to which it is to be mounted. Blade member 44 has a source plate portion 44a, the center of seismic mass, attached at each lateral side to a respective beam 44b defined by a slot 44c which extends the full length of blade member 44, i.e., along a y-axis. Each opposite end of beam 44b is integrally attached to a respective side of a central brace portion 44d. Central brace portion 44d is attached at each side to a laterally extending, i.e., along an x-axis, slender isolation beam 44e defined by a laterally extending slot f and a curved end portion 44g of slot 44c. Beams 44e are in turn connected to an attachment portion 44h through slender, laterally extending isolation beams 44i and a counterflexing zone 44j. Beams 44i extend above and below isolation windows 44k and are defined by slot 44l on the top and slot 44f on the bottom, as seen in FIG. 10. Isolation slots 44m extend downwardly from slot 44l to match end portions 44n of slot 44f.

A welded attachment to a mounting member is made at attachment portion 44h. Changes in temperature will result in a bending stress being applied to the weld region causing the blade member to bend or develop a curvature. The input to the blade member from this curvature is to impose a curved boundary condition to the blade member at the attachment area. The boundary condition is circular in nature and will cause bending around the x-axis and the y-axis.

Windows 44k cut in the attachment portion create two slender, laterally extending isolation beams 44i that reduce the rigidity of the attachment portion. Along the x-axis the beams bend to form an "s" shape in the direction of the z-axis, i.e., perpendicular to the plane in which the blade member lies, which reduces the transmission of stress boundary condition rather than acting as a stiff lever arm as would happen without windows 44k. Beam members 44i also twist in response to the y-direction imposed boundary condition. Isolation cuts 44m, 44n enhance the ability of beam members 44i to twist. The counterflexing zone 44i extends from the isolation cuts 44m down to the curved slot 44g. The function of the counterflexing zone is to contain remaining x-direction bending stresses to the x-direction. The lateral position of curve slot 44g relative to slot 44f is selected to define slender beams 44e which extend laterally, generally parallel to beam 44i to central brace portion 44d. If curved slot 44g were moved outward toward beams 44b, a y-direction stress component would be generated, forcing central brace portion 44d to tilt, changing the capacitor gap at source plate portion 44a. The central brace portion 44d is a stiff section to stop further transmission of the boundary condition stress. The end result of this arrangement of beams and holes is to allow thermal stresses generated in the weld attachment to gradually be diminished, while not changing the capacitor gap at source plate portion 44a.

The critical aspects of blade member 44 to enable good drop performance are those that minimize stress concentrations during a cross axis shock while allowing a high degree of flexibility in the sensing direction. Curved slot feature 44g is formed with a relatively large radius to reduce notch stresses from an x-axis drop. Tapered sections 44o and 44p of beams 44b are tapered to minimize the moment stress applied to the arcs where beams 44b are connected to central brace portion 44d. The width of slot 44c is selected to allow counterflexing zone 44j to act as a cross axis stop. This minimizes stresses generated in beams 44b. The welded attachment area is positioned over the center of mass of the blade member to minimize torsional shear stress of the weld during a cross axis shock test.

The size of source plate portion 44i is selected for controlling the squeeze film damping factor. That is, if the size is too small, portion 44i will resonate and if it is too large, it will not be sufficiently sensitive. Beams 44b are sized to provide adequate movement of the seismic mass, i.e., portion 44i. The blade is chemically etched using standard integrated circuit lead frame processing to provide a stress free, flat part preferably in reel form. Mounting parts on reels reduces handling and transportation damages as well as allows for high speed automated assembly.

Figure 11:
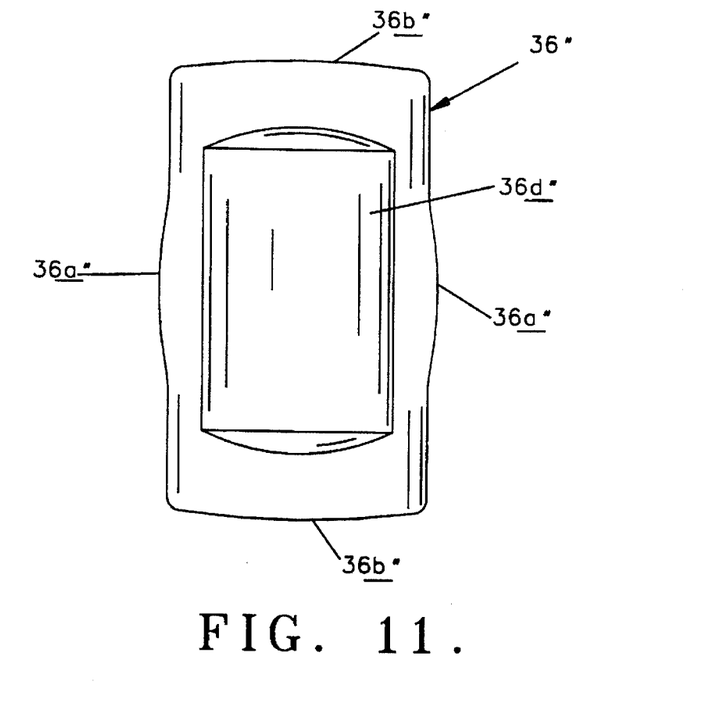
FIGS. 11 and 12 are front elevation and top views, respectively, of an enlarged scale of a blade member mounting element used in another embodiment of the invention.
Figure 12:
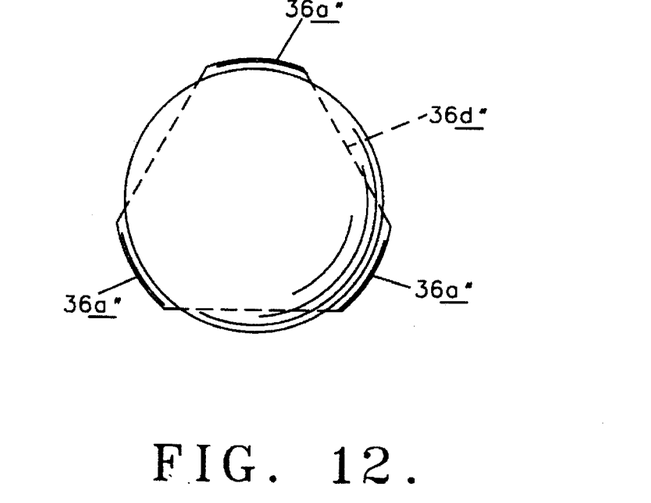

With respect to FIGS. 11 and 12 a pin 36" is shown formed with a plurality of longitudinally extending ribs 36a", preferably having a radiused outer peripheral surface. The ribs can be formed by any suitable means as by stamping equally spaced flat portions 36d" each covering 90°, for example, leaving three ribs each covering 30° and having an outer radius for each rib comparable but slightly larger than that of the pin before stamping. For use with a bore 0.099/0.097 inch in diameter, pin 36" is acceptable if it passes through a ring gap of 0.1015 inch and not pass a gap of 0.1005 inch. As mentioned above, acceptable insertion force can be anywhere from approximately 10 to approximately 200 pounds. More specifically, with regard to the FIG. 11 and 12 pin, an insertion force of between 50 and 100 pounds has been found to be suitable. Ends 36b" of pin 36" are formed with a suitable radius such as 0.125/0.280 to serve as a weld projection so that either end can be inserted in the bore.

Figure 13:
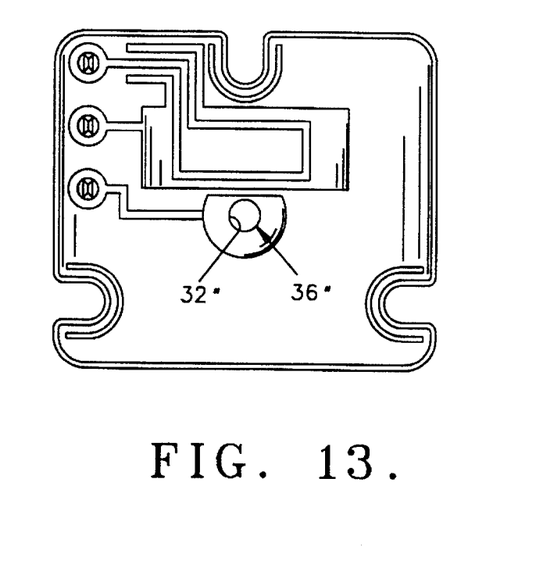
FIGS. 13 and 14 are a plan view and a front view, respectively, of a substrate adapted for use with the FIG. 10 blade member.
Figure 14:
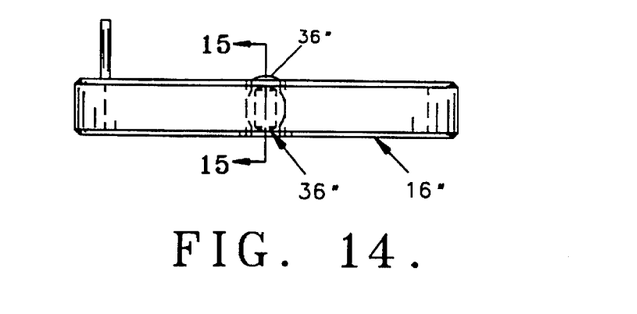
Figure 15:
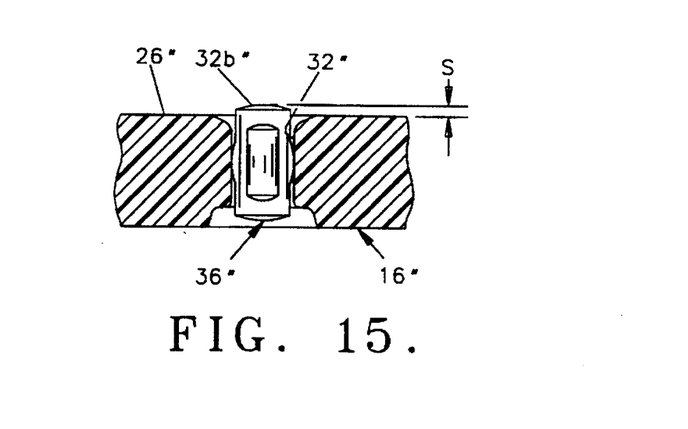
FIG. 15 is an enlarged cross sectional view taken on line 15—15 of FIG. 14.
Figure 16:
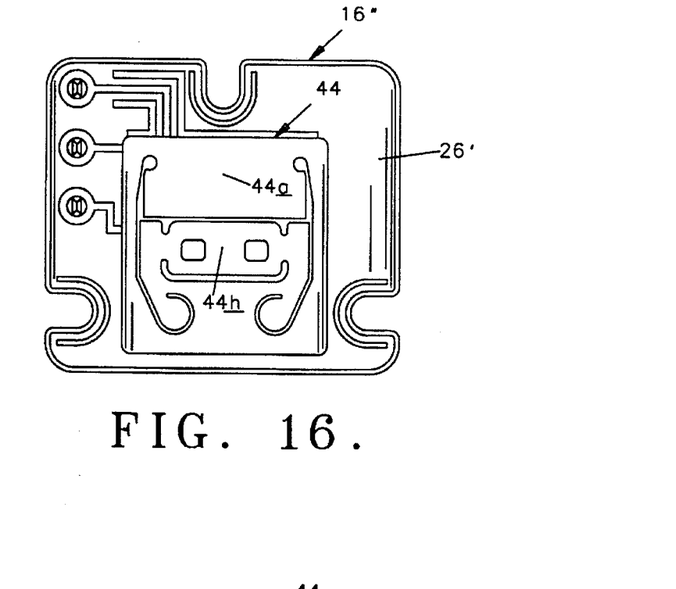
FIG. 16 is a plan view of the FIG. 13 substrate with the FIG. 10 blade member mounted thereon.
Figure 17:
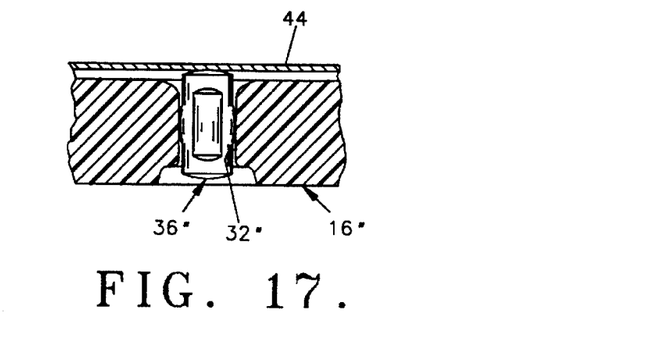
FIG. 17 is an enlarged cross sectional view similar to FIG. 15 but with the FIG. 10 blade member mounted on the FIG. 11 pin.

Substrate 16" shown in FIGS. 13–15 may be composed of the same material as substrate 16 discussed supra, e.g., 94 percent alumina. Bore 32" is centrally disposed on top surface 26" and pin 36" may be forced into bore 32" so that weld projection surface 36b" extends above the surface a selected distance "s" shown in FIG. 15. Blade member 44 is mounted on substrate 16" by welding attachment portion 44a to weld projection surface 36b" with source plate portion 44i aligned with and spaced-over detect plate 24. In order to ensure the desired spacing, spacers of Kapton, or the like can be placed between blade member 44 and surface 26" on opposite sides of attachment portion 44a or specially machined fixtures can be employed. However, preferably, as described above with reference to blade member 40, blade member 44 may be welded to pin 36" before or after being inserted into bore 32" and the capacitance between source plate portion 44a and detect plate 24 can be monitored as the pin is moved in the bore with movement being stopped at the appropriate spacing when the selected capacitance value is obtained.

Figure 18:
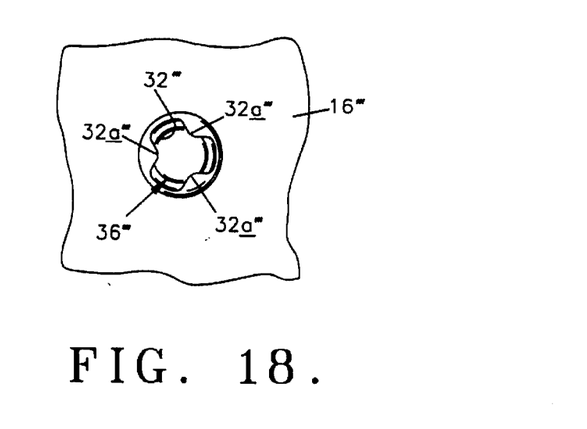
FIG. 18 is a plan view of a portion of a substrate having a splined bore suitable for receiving a standard cylindrical blade member attachment element.

It is also within the purview of the invention to use a pin 36'" having a smooth cylindrical surface and to form bore 32 with a plurality of splines 32a are spaced about the periphery and projecting into the bore so that an interference fit is formed between pin 36'" and splines 32a as shown in FIG. 18.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed:

1. A method for making an acceleration sensor comprising the steps of:
   forming a substrate having an electrically insulative top surface and a bottom surface and with a bore extending into the substrate through the top surface at a mounting portion formed on the top surface,
   placing an electrically conductive detect plate on the top surface and providing electrical circuit paths on the substrate in connection with the detect plate and the mounting portion,
   forming a movable blade assembly comprising an electrically conductive, flexible metal blade member having an attachment portion, a source plate portion and integral, resilient beams connecting the attachment portion to the source plate portion, and an electrically conductive mounting element having first and second ends,
   inserting the electrically conductive mounting element into the bore in electrical engagement with a respective circuit path and with the first end extending above the top surface a selected distance and with the source plate portion overlying the detect plate in selected spaced relation to form a capacitor.

2. A method for making an acceleration sensor according to claim 1 including the step of welding the attachment portion to the first end of the electrically conductive mounting element prior to inserting the element into the bore.

3. A method for making an acceleration sensor according to claim 2 including the steps of connecting the detect plate and the metal blade member to an electrical source and monitoring the capacitance level as the mounting element is inserted into the bore, the selected distance the mounting element extends above the top surface being determined when the selected capacitance level is obtained.

4. A method for making an acceleration sensor according to claim 1 including the step of welding the attachment portion to the first end of the electrically conductive mounting element after inserting the element into the bore.

5. A method for making an acceleration sensor according to claim 4 in which the bore extends between the top and bottom surfaces and the mounting element extends above the top surface a distance less than the selected distance and including the step, after the step of welding the attachment portion to the first end of the mounting element, of connecting the detect plate and the metal blade member to an electrical source, and monitoring the capacitance level while applying a force to the second end of the mounting element through the bore from the bottom surface to move the mounting element until a selected capacitance level is obtained.

6. A method for making an acceleration sensor according to claim 4 in which the mounting element extends above the top surface a distance greater than the selected distance and including the step, after the step of welding the attachment portion to the first end of the mounting element, of connecting the detect plate and the metal blade member to an electrical source, and monitoring the capacitance level while applying a force through the blade member to move the mounting element until a selected capacitance level is obtained.

7. A method for making an acceleration sensor according to claim 1 in which the attachment portion of the flexible metal blade member is centralized relative to the plate.

8. A method for making an acceleration sensor according to claim 1 in which the mounting element is a solid pin.

9. A method for making an acceleration sensor according to claim 1 in which the mounting element is a hollow pin in which the said first end is a closed end.

10. A method for making an acceleration sensor according to claim 1 in which the substrate is composed of 94 percent alumina ceramic and the flexible metal blade member and mounting element are each composed of metal having a nominal composition of 42 percent nickel and the balance iron.

11. A method for making an acceleration sensor according to claim 1 including the step of forming a knurled surface on the outer periphery of the mounting element.

12. A method for making an acceleration sensor according to claim 1 in which the mounting element is generally cylindrical and has a longitudinal axis extending between the opposite ends of the element including the step of forming a plurality of longitudinally extending ribs on the outer peripheral surface of the element.

13. A method for making an acceleration sensor according to claim 12 in which the ribs are formed with a curved outer surface.

14. A method for making an acceleration sensor according to claim 12 in which the outer peripheral surface of the three ribs comprise approximately 90° of the outer peripheral surface of the element.

15. A method for making an acceleration sensor according to claim 1 including the step of inserting the mounting element in the bore using a force between a minimum of approximately 10 pounds and a maximum of approximately 200 pounds.

16. A method for making an acceleration sensor according to claim 14 including the step of inserting the mounting element into the bore using a force between a minimum of approximately 10 pounds and a maximum of approximately 200 pounds.

17. A method for making an acceleration sensor according to claim 14 including the step of inserting the mounting element into the bore using a force between a minimum of approximately 50 pounds and a maximum of approximately 100 pounds.

* * * * *